US011687967B2

(12) United States Patent
Sheppard et al.

(10) Patent No.: US 11,687,967 B2
(45) Date of Patent: Jun. 27, 2023

(54) METHODS AND APPARATUS TO ESTIMATE THE SECOND FREQUENCY MOMENT FOR COMPUTER-MONITORED MEDIA ACCESSES

(71) Applicant: The Nielsen Company (US), LLC, New York, NY (US)

(72) Inventors: Michael R. Sheppard, Holland, MI (US); Jonathan Sullivan, Hurricane, UT (US); Jake Ryan Dailey, San Francisco, CA (US); Diane Morovati Lopez, West Hills, CA (US); Molly Poppie, Arlington Heights, IL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

(21) Appl. No.: 17/947,928

(22) Filed: Sep. 19, 2022

(65) Prior Publication Data
US 2023/0023392 A1    Jan. 26, 2023

Related U.S. Application Data

(63) Continuation of application No. 16/917,260, filed on Jun. 30, 2020, now Pat. No. 11,455,652.

(51) Int. Cl.
*G06Q 30/0242*    (2023.01)
*H04L 65/60*    (2022.01)
(Continued)

(52) U.S. Cl.
CPC ......... *G06Q 30/0242* (2013.01); *G06F 16/43* (2019.01); *H04L 65/60* (2013.01); *H04L 67/535* (2022.05)

(58) Field of Classification Search
CPC ... G06Q 30/0242; G06F 16/43; H04L 67/535; H04L 65/60
See application file for complete search history.

(56) References Cited

U.S. PATENT DOCUMENTS 5,950,185 A    9/1999    Alon et al.
6,108,637 A    8/2000    Blumenau
(Continued)

FOREIGN PATENT DOCUMENTS

| CA | 2391829 C | * | 2/2011 | ......... G06F 16/2423 |
| CN | 108427688 B | * | 1/2022 | ....... G06F 16/24547 |
| WO | WO-2022040448 A1 | * | 2/2022 | ............. G06F 16/48 |

OTHER PUBLICATIONS

Alon et al., "The Space Complexity of Approximating the Frequency Moments," Journal of Computer and System Sciences, [http://www.idealibrary.com], 1999, 11 pages.
(Continued)

*Primary Examiner* — James R Sheleheda
(74) *Attorney, Agent, or Firm* — Hanley, Flight and Zimmerman, LLC

(57) ABSTRACT

A disclosed example includes at least one memory, programmable circuitry, and instructions to cause the programmable circuitry to increment a first value corresponding to a first position in a vector based on a first bit value representation, the first bit value representation corresponding to a first audience member identifier; increment a second value corresponding to a second position in the vector based on a second bit value representation, the second bit value representation corresponding to a second audience member identifier; estimate the second frequency moment of the media impression data using the vector; determine the variance of the second frequency moment; and based on the second
(Continued)

frequency moment, schedule a query of the media impression data to be processed by a computer at a future time.

21 Claims, 5 Drawing Sheets

(51) Int. Cl.
*G06F 16/43* (2019.01)
*H04L 67/50* (2022.01)

(56) References Cited

U.S. PATENT DOCUMENTS

| | | | |
|---|---|---|---|
| 8,370,489 | B2 | 2/2013 | Mazumdar et al. |
| 8,930,701 | B2 | 1/2015 | Burbank et al. |
| 9,237,138 | B2 | 1/2016 | Bosworth et al. |
| 10,205,994 | B2 | 2/2019 | Splaine et al. |
| 10,579,827 | B2 | 3/2020 | Telford et al. |
| 11,039,190 | B1* | 6/2021 | Dailey ............. H04N 21/26613 |
| 11,455,652 | B2* | 9/2022 | Sheppard ............. H04L 67/535 |
| 2010/0295839 | A1* | 11/2010 | Nagaya .................... H04N 5/63 345/212 |
| 2011/0004663 | A1* | 1/2011 | Zito ..................... G06Q 10/107 707/661 |
| 2011/0015992 | A1 | 1/2011 | Liffiton et al. |
| 2012/0143830 | A1 | 6/2012 | Cormode et al. |
| 2013/0103713 | A1 | 4/2013 | Woodruff et al. |
| 2013/0246608 | A1 | 9/2013 | Liu et al. |
| 2015/0046579 | A1 | 2/2015 | Perez et al. |
| 2015/0178769 | A1 | 6/2015 | Mirisola et al. |
| 2015/0186403 | A1 | 7/2015 | Srivastava et al. |
| 2017/0004526 | A1 | 1/2017 | Morovati et al. |
| 2018/0246649 | A1 | 8/2018 | Datar et al. |
| 2018/0349933 | A1 | 12/2018 | Modarresi et al. |
| 2021/0406232 | A1 | 12/2021 | Sheppard et al. |
| 2021/0406947 | A1 | 12/2021 | Sheppard et al. |
| 2022/0198779 | A1* | 6/2022 | Saraee ................... G06N 3/045 |

OTHER PUBLICATIONS

Woodruff, "Optimal Space Lower Bounds for all Frequency Moments," [https://researcher.watson.ibm.com/researcher/files/us-dpwoodru/soda2.pdf], 2004, 9 pages.

Good, "C332. Surprise indexes and p-values," Taylor & Francis Online, [https://www.tandfonline.com/doi/abs/10.1080/00949658908811160], 1989, 4 pages.

United States Patent and Trademark Office, "Non-Final Office Action," issued in connection with U.S. Appl. No. 16/917,260, dated Jan. 27, 2022, 9 pages.

United States Patent and Trademark Office, "Notice of Allowance and Fee(s) Due," issued in connection with U.S. Appl. No. 16/917,260, dated May 17, 2022, 5 pages.

* cited by examiner

METHODS AND APPARATUS TO ESTIMATE THE SECOND FREQUENCY MOMENT FOR COMPUTER-MONITORED MEDIA ACCESSES

RELATED APPLICATION

This patent arises from a continuation of U.S. patent application Ser. No. 16/917,260, filed Jun. 30, 2020, now U.S. Pat. No. 11,455,652, entitled "METHODS AND APPARATUS TO ESTIMATE THE SECOND FREQUENCY MOMENT FOR COMPUTER-MONITORED MEDIA ACCESSES." Priority to U.S. patent application Ser. No. 16/917,260 is claimed. U.S. patent application Ser. No. 16/917,260 is hereby incorporated herein by reference in its entirety.

FIELD OF THE DISCLOSURE

This disclosure relates generally to monitoring media content, and, more particularly, to methods and apparatus to estimate the second frequency moment for computer-monitored media accesses.

BACKGROUND

Traditionally, monitoring entities determine audience exposure to media based on registered panel members. That is, a monitoring entity such as an audience measurement entity (AME) enrolls people who consent to being monitored into a panel. The AME then monitors those panel members to determine media (e.g., television programs or radio programs, movies, digital versatile disks (DVDs), advertisements, webpages, streaming media, etc.) exposed to those panel members. In this manner, the AME can determine exposure metrics for different media based on the collected media measurement data.

As people are accessing more and more media through digital means (e.g., via the Internet), it is possible for monitoring entities providing such media to track all instances of exposure to media (e.g., on a census wide level) rather than being limited to exposure metrics based on enrolled panel members.

Figure 1:
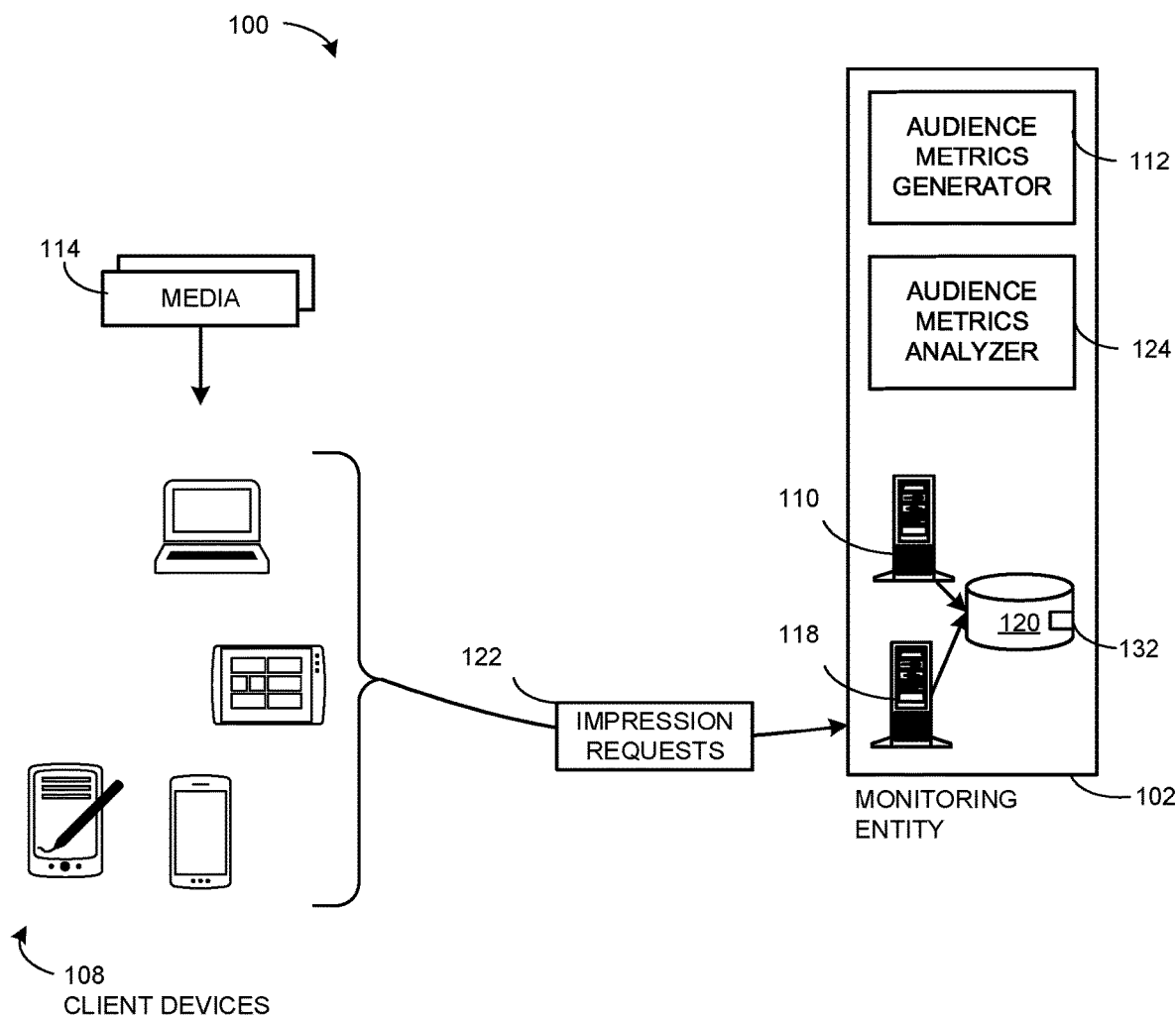
FIG. 1 is an example block diagram of an environment to implement a technique for logging impressions of accesses to server-based media.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Providers of media (e.g., content, advertisements, advertisement campaigns) often desire to determine an accurate count representative of a number of users accessing their media (e.g., the number of times the media is accessed). This can be accomplished by generating and/or otherwise identifying media data relating to the number of users accessing their media. Techniques for monitoring user access to an Internet-accessible media (e.g., techniques for generating and/or identifying media data), such as digital television (DTV) media and Internet-based digital media, have evolved significantly over the years. Internet-accessible media is also known as digital media. In some examples to generate and/or identify media data, such monitoring is performed primarily through server logs. In particular, entities serving media on the Internet log the number of requests received for their media at their servers. Records or logs to record such requests are example types of media data. Server logs can be tampered with either directly or via zombie programs, which repeatedly request media from the server to increase the server log counts of media. Also, media is sometimes retrieved once, cached locally and then repeatedly accessed from the local cache without involving the server. Both of these scenarios lead to inaccurate audience measurements.

Another technique to generate and/or identify media data include the inventions disclosed in Blumenau, U.S. Pat. No. 6,108,637, which is hereby incorporated herein by reference in its entirety, that fundamentally changed the way Internet monitoring is performed. For example, Blumenau disclosed a technique wherein Internet media to be tracked is tagged with monitoring instructions. In particular, monitoring instructions are associated with the hypertext markup language (HTML) of the media to be tracked. When a client requests the media, both the media and the monitoring instructions are downloaded to the client. The monitoring instructions are, thus, executed whenever the media is accessed, be it from a server or from a cache. Upon execution, the monitoring instructions cause the client to send or transmit monitoring information from a content display site to a content provider site. The monitoring information is indicative of the manner in which content was displayed.

In some implementations, an impression request can be used to send or transmit monitoring information by a client device using a network communication in the form of a hypertext transfer protocol (HTTP) request (or hypertext transfer protocol secure (HTTPS) request). In this manner, the impression request reports the occurrence of a media impression at the client device. For example, the impression request includes information to report access to a particular item of media (e.g., an advertisement, a webpage, an image, video, audio, etc.). In some examples, the impression request or ping request can also include a cookie previously set in the browser of the client device that may be used to identify a user that accessed the media. That is, impression requests cause monitoring data reflecting information about an access to the media to be sent from the client that downloaded the media to a monitoring entity and can provide a cookie to identify the client device and/or a user of the client device. Sending the monitoring data from the client to the monitoring entity is known as an impression request. In examples disclosed herein, the monitoring entity is the same entity that provides the media to the client. However, in other examples disclosed herein, the monitoring entity may be an audience measurement entity (AME) that did not provide the media to the client and who is a trusted (e.g., neutral) third party for providing accurate usage statistics (e.g., The Nielsen Company, LLC).

There are many monitoring entities operating on the Internet. These monitoring entities provide services to large numbers of subscribers. In exchange for the provision of services, the subscribers register with the monitoring entities. Examples of such monitoring entities include social network sites (e.g., Facebook, Twitter, MySpace, etc.), multi-service sites (e.g., Yahoo!, Google, Axiom, Catalina, etc.), online retailer sites (e.g., Amazon.com, Buy.com, etc.), credit reporting sites (e.g., Experian), streaming media sites (e.g., YouTube, Hulu, etc.), etc. These monitoring entities set cookies and/or other device/user identifiers on the client devices of their subscribers to enable the monitoring entity to recognize their subscribers when they visit their web site.

As used herein, an impression is defined to be an event in which a home or individual accesses and/or is exposed to media (e.g., an advertisement, content, a group of advertisements and/or a collection of content). In Internet media delivery, a quantity of impressions or impression count is the total number of times media (e.g., content, an advertisement, or an advertisement campaign) has been accessed by a web population (e.g., the number of times the media is accessed). In some examples, an impression or media impression is logged by the monitoring entity in response to an impression request from a user/client device that requested the media. For example, an impression request is a message or a communication (e.g., an HTTP request) sent by a client device to an impression collection server of the monitoring entity to report the occurrence of a media impression at the client device. In response, the impression collection server logs an impression in an impression record. Logged impression records based on impression requests are another example type of media data.

In non-Internet media delivery, such as television (TV) media, a television or a device attached to the television (e.g., a set-top-box or other media monitoring device) may monitor media presented by the television. The monitoring generates a log of impressions associated with the media displayed on the television. The television and/or connected device may transmit impression logs to the monitoring entity to log the media impressions. Such an impression log is another example type of media data.

A user of a computing device (e.g., a mobile device, a tablet, a laptop, etc.) and/or a television may be exposed to the same media via multiple devices (e.g., two or more of a mobile device, a tablet, a laptop, etc.) and/or via multiple media types (e.g., digital media available online, digital TV (DTV) media temporality available online after broadcast, TV media, etc.). For example, a user may start watching the Walking Dead television program on a television as part of TV media, pause the program, and continue to watch the program on a tablet as part of DTV media. In such an example, the exposure to the program may be logged by the monitoring entity twice, once for an impression log associated with the television exposure, and once for the impression request generated by the tablet. Multiple logged impressions associated with the same program and/or same user are defined as duplicate impressions.

As another media monitoring example, the inventions disclosed in Mazumdar et al., U.S. Pat. No. 8,370,489, which is incorporated by reference herein in its entirety, enable a monitoring entity to collect more extensive media data (e.g., Internet usage data) by extending the impression request process to encompass partnered database proprietors and by using such partners as interim data collectors. The inventions disclosed in Mainak accomplish this task by structuring the monitoring entity to respond to impression requests from clients (who may not be a member of an audience measurement panel and, thus, may be unknown to the monitoring entity) by redirecting the clients from the monitoring entity to a database proprietor, such as a social network site partnered with the monitoring entity, using an impression response. Such a redirection initiates a communication session between the client accessing the tagged media and the database proprietor. For example, the impression response received from the monitoring entity may cause the client to send a second impression request to the database proprietor. In response to receiving this impression request, the database proprietor (e.g., Facebook) can access any cookie it has set on the client to thereby identify the client based on the internal records of the database proprietor. In the event the client corresponds to a subscriber of the database proprietor, the database proprietor logs/records a database proprietor demographic impression in association with the client/user. Impressions logged in this manner generate another example type of media data.

In another media monitoring example, monitoring entities may generate and/or otherwise obtain sketch data. Sketch data provides summary information about an underlying dataset without revealing personally identifiable information (PII) data for individuals that may be included in the dataset. Such sketch data may include a cardinality defining the number of individuals represented by the data, but maintaining the identity of such individuals private. The cardinality of sketch data associated with media exposure is a useful piece of information for monitoring entity because it provides an indication of the number of audience members exposed to particular media via a platform maintained by the monitoring entity providing the sketch data. Sketch data may be a fifth example type of media data.

As another media monitoring example, the inventions disclosed in Burbank et al., U.S. Pat. No. 8,930,701, which is incorporated by reference herein in its entirety, enable a monitoring entity to track media impressions for media presented by mobile device applications that execute on a mobile device. The inventions disclosed in Burbank enable this by using an application campaign ratings (ACR) identifier to encode multiple device and/or user identifiers found in a mobile device. The one or more encrypted device/user identifier(s) can then be used to retrieve user information for a user of the mobile device by sending the one or more encrypted device/user identifier(s) to one or more corresponding monitoring entities that store user information for its registered users. In the illustrated examples, the monitoring entity has the respective key(s) useable to decrypt device/user identifier(s) pertaining to its services (e.g., wireless carrier services, social networking services, email services, mobile phone ecosystem app or media services, etc.). In this manner, personally-identifying information for particular services will be available to the monitoring entity that provides the particular service. The device/user identifier(s) may be used to generate another example type of media data.

Although examples disclosed herein are described in association with audience metrics related to media impressions, examples disclosed herein may be similarly used for other applications to identify the second frequency moment of a set of data. The datasets themselves need not be audiences. They could be, for example, a username, a full name, a street address, a residence city and/or state, telephone numbers, email addresses, ages, dates of birth, social security numbers, demographic information, bank accounts, lists of purchased items, store visits, traffic patterns, and/or any other personal information provided by subscribers in exchange for services from a monitoring entity. The datasets could be represented as lists of numbers or any other information.

In examples disclosed herein, the media impression data (e.g., any of server logs, impression logs, sketch data, device/user identifier(s), etc.) may be stored in a database and used by the monitoring entities when estimating, determining, and/or otherwise identifying the second frequency moment. As used herein, the second frequency moment may be referred to as the repeat rate indicative of how frequent a data item or a set of data items appears in a data set. The second frequency moment is useful for determining the output size of self-joins (e.g., identifying how many times person A and person B appear together) in databases and/or the surprise index of the media impression data, or any suitable data, in the database. As used herein, the surprise index is defined using Equation 1 below.

$$\lambda_i = \frac{\rho}{p_i}, \text{ where } \rho = E_j * p_j = \text{sum}(p_i^2) \quad \text{Equation 1}$$

In Equation 1, $\lambda_i$ is the surprise index, rho ($\rho$) is the repeat rate (e.g., Gini's index of homogenity), and p is a probability in a data set. For example, if there are n possible mutually exclusive outcomes having probabilities $p_1, p_2, \ldots, p_n$, in the event the ith probability occurs, the surprise index is defined by Equation 1. As an example, a monitoring entity may observe a dataset of media impression data (e.g., any of server logs, impression logs, sketch data, device/user identifier(s), etc.) as {f, c, d, f, b, f, e, a, e, d} in which the elements A={a, b, c, d, e, f} each occur $m_i$={1, 1, 1, 2, 2, 3} times. Accordingly, the second frequency moment in such an example may be defined by the Equation 2 below.

$$F_2 = \sum_{i=1}^{m} m_i^2 = 20 \quad \text{Equation 2}$$

The second frequency moment is useful to estimate costs (e.g., computer access time, computer processing power, computer resource usage, etc.) to service a query request of data or self-joins of the media impression data in a database. For example, a query request of a set of data may request to identify the quantity of occurrences of either a data element, or set of data elements, a database. In this manner, the second frequency moment is useful to estimate the cost (e.g., computer time, computer processing power, computer resource usage, etc.) needed by a computer (e.g., the computer 110) to complete the query request. Examples disclosed herein utilize a vector of counts methodology to estimate the second frequency moment of a dataset.

Examples disclosed herein employ a vector of counts generated using a vector of length k in which each of the k positions (or bins) is populated based on collected media impression data (e.g., any of server logs, impressions, impression logs, sketch data, device/user identifier(s), etc.). For example, a monitoring entity may observe one thousand (1,000) audience members exposed to a type of media. In the event the vector length, k, is determined to be ten (10), each of the one thousand (1,000) elements is subsequently input through a hashing function and the corresponding output of the hashing function identifies which bins of the k bin positions to be incremented based on those input elements. As used herein, each element in the monitoring data may be input through a hashing function to convert the string representation of the media exposure element into a series of bits (e.g., base two bits, base 16 bits, etc.) representative of a k position or bin. In a numerical example, given the monitoring entity and the one thousand (1,000) exposures to media, an example vector of counts with k=10 bin positions may be generated based on the hashing function as [106, 96, 111, 91, 98, 89, 96, 107, 101, 105].

In the vector of counts methodology, k is determined based on a desired or target precision threshold. In examples disclosed herein, k may be determined based on user preference, computer processor limitations, production costs, and/or desired accuracy of result. For example, if k were ten (10), the precision threshold may be a first level, while if K were twenty (20), the precision threshold may be a second level, higher than the first level. In such an example, the first level and the second level indicate levels of precision, where the second level is more precise than the first level.

Examples disclosed herein include methods and apparatus to estimate the second frequency moment of a database using the vector of counts methodology. Further, examples disclosed herein employ methods and apparatus to utilize data from an audience metrics database associated with a single monitoring entity that may include duplicate elements. As used herein, an audience metrics database that may include duplicate elements is configured to store media monitoring data in which the use of the audience metrics database does not require a deduplication method to be performed. For example, the audience metrics database may be a database that includes duplicate data elements (e.g., two elements indicating Person A visited website A in which such two elements are duplicates). In an alternate example, the audience metrics database may be a database that in fact has been previously deduplicated. However, in such an example, examples disclosed herein do not require the additional steps of verifying whether a deduplication method has been applied, whether a deduplication method should be applied, or whether a previously applied deduplication method resulted in accurate values.

FIG. 1 shows an example environment 100 that includes an example monitoring entity 102 and example client devices 108. The example monitoring entity 102 includes an example monitoring entity computer 110 that implements an example audience metrics generator 112 to determine audience sizes based on logged media impressions and an example audience metrics analyzer 124 to estimate the second frequency moment. In the illustrated example of FIG. 1, the monitoring entity computer 110 may also implement an impression monitor system to log media impressions reported by the client devices 108. In the illustrated example of FIG. 1, the client devices 108 may be stationary or portable computers, handheld computing devices, smart phones, Internet appliances, smart televisions, and/or any other type of device that may be connected to the Internet and capable of presenting media.

As used herein, an audience size is defined as a number of audience members exposed to a media item of interest for audience metrics analysis (e.g., determining the second frequency moment). In some examples, an audience size is a unique audience size (without duplicates) that represents a count of unique individuals counted only once regardless of the number of times each individual accessed the media item. In other examples, an audience size represents a count of individuals, some of which are counted two or more times, that accessed the media item. As used herein, a media impression is defined as an occurrence of access and/or exposure to media 114 (e.g., an advertisement, a movie, a movie trailer, a song, a web page banner, etc.). Examples disclosed herein may be used to estimate the second frequency moment of collected media impression data (e.g., any of server logs, impression logs, sketch data, device/user identifier(s), etc.) for media impressions of any one or more media types (e.g., video, audio, a web page, an image, text, etc.). In examples disclosed herein, the media 114 may be content and/or advertisements. Examples disclosed herein are not restricted for use with any particular type of media.

In the illustrated example of FIG. 1, the monitoring entity 102 distributes the media 114 via the Internet to users that access websites and/or online television services (e.g., web-based TV, Internet protocol TV (IPTV), etc.). In examples disclosed here, the media 114 is served by media servers of the same internet domains as the monitoring entity 102. For example, the monitoring entity includes corresponding servers 118 that can serve media 114 to their corresponding subscribers via the client devices 108. Examples disclosed herein can be used to generate media impression data (e.g., based on any of server logs, impression logs, sketch data, device/user identifier(s), etc.) corresponding to the media served by the monitoring entity 102. For example, the monitoring entity 102 may use such media impression data to promote their online media serving services (e.g., ad server services, media server services, etc.) to prospective clients. By showing media impression data indicative of audience sizes drawn by the monitoring entity 102, the monitoring entity 102 can sell their media serving services to customers interested in delivering online media to users.

In some examples, the media 114 is presented via the client devices 108. When the media 114 is accessed by the client devices 108, the client devices 108 send an impression request 122 to the server 118 to inform the servers 118 of the media accesses. In this manner, the server 118 can log media impressions in impression records of an example audience metrics database 120. In the illustrated example of FIG. 1, the monitoring entity 102 logs demographic impressions corresponding to accesses by the client devices 108 to the media 114. Demographic impressions are impressions logged in association with demographic information collected by the monitoring entity 102 from registered subscribers of their services.

In some examples, the media 114 is encoded to include a media identifier (ID). The media ID may be any identifier or information that can be used to identify the corresponding media 114. In some examples the media ID is an alphanumeric string or value. In some examples, the media ID is a collection of information. For example, if the media 114 is an episode, the media ID may include program name, season number, and episode number. When the media 114 includes advertisements, such advertisements may be content and/or advertisements. The advertisements may be individual, standalone ads and/or may be part of one or more ad campaigns. In some examples, the ads of the illustrated example are encoded with identification codes (i.e., data) that identify the associated ad campaign (e.g., campaign ID, if any), a creative type ID (e.g., identifying a Flash-based ad, a banner ad, a rich type ad, etc.), a source ID (e.g., identifying the ad publisher), and/or a placement ID (e.g., identifying the physical placement of the ad on a screen). In some examples, advertisements tagged with the monitoring instructions are distributed with Internet-based media content such as, for example, web pages, streaming video, streaming audio, IPTV content, etc. As noted above, methods, apparatus, systems, and/or articles of manufacture disclosed herein are not limited to advertisement monitoring but can be adapted to any type of content monitoring (e.g., web pages, movies, television programs, etc.).

In some examples, media impression data is collected by the server 118 based on beacon requests from tagged media. For example, the media 114 of the illustrated example is tagged or encoded to include monitoring or tag instructions, which are computer executable monitoring instructions (e.g., Java, java script, or any other computer language or script) that are executed by web browsers that access the media 114 via, for example, the Internet. Execution of the monitoring instructions causes the web browser to send the impression request 122 (e.g., also referred to as tag requests) to one or more specified servers of the monitoring entity 102. As used herein, a tag request 122 is used by the client devices 108 to report occurrences of media impressions caused by the client devices accessing the media 114. In the illustrated example, the tag request 122 include user-identifying information that the monitoring entity 102 can use to identify the subscriber that accessed the media 114. For example, when a subscriber of the monitoring entity 102 logs into a server, the monitoring entity 102 sets a cookie on the client device 108 and maps that cookie to the subscriber's identity/account information at the server 118. In examples disclosed herein, subscriber identity and/or subscriber account information includes personally identifiable information (PII) such as username, full name, street address, residence city and/or state, telephone numbers, email addresses, ages, dates of birth, social security numbers, demographic information, bank accounts, lists of purchased items, store visits, traffic patterns and/or any other personal information provided by subscribers in exchange for services from the monitoring entity 102. By having such PII data mapped to cookies, the monitoring entity 102 can subsequently identify the subscriber based on the cookie to determine when that user accessed different media 114 and to log an impression in association with demographics and/or other PII data of that user. In the illustrated example of FIG. 1, the impression request 122 includes cookies of the client devices 108 to inform the monitoring entity 102 of the particular subscribers that accessed the media 114.

The tag request 122 may be implemented using HTTP requests. However, whereas HTTP requests are network communications that traditionally identify web pages or other resources to be downloaded, the tag request 122 of the illustrated example are network communications that include audience measurement information (e.g., ad campaign identification, content identifier, and/or user identification information) as their payloads. The server (e.g., the monitoring entity computer 110 and/or the server 118) to which the tag request 122 is directed is programmed to log occurrences of impressions reported by the tag request 122. Further examples of monitoring instructions (e.g., beacon instructions) and uses thereof to collect impression data are disclosed in Mazumdar et al., U.S. Pat. No. 8,370,489, entitled "Methods and Apparatus to Determine Impressions using Distributed Demographic Information," which is hereby incorporated herein by reference in its entirety.

In other examples in which the media 114 is accessed by apps on mobile devices, tablets, computers, etc. (e.g., that do not employ cookies and/or do not execute instructions in a web browser environment), media impression data may be collected by the server 118 based on network communications from data collectors installed in such devices. For example, an app publisher (e.g., an app store) can provide a data collector in an install package of an app for installation at the client devices 108. When a client device 108 downloads the app and consents to the accompanying data collector being installed at the client device 108 for purposes of audience/media/data analytics, the data collector can detect when the media 114 is accessed at the client device 108 and cause the client device 108 to send the impression requests 122 to report the access to the media 114. In such examples, the data collector can obtain user identifiers and/or device identifiers stored in the client devices 108 and send them in the impression request 122 to enable the monitoring entity 102 to log impressions. Further examples of using a collector in client devices to collect impression data are disclosed in Burbank et al., U.S. Pat. No. 8,930,701, entitled "Methods and Apparatus to Collect Distributed User Information for Media Impressions and Search Terms," and in Bosworth et al., U.S. Pat. No. 9,237,138, entitled "Methods and Apparatus to Collect Distributed User Information for Media Impressions and Search Terms," both of which are hereby incorporated herein by reference in their entireties.

In yet other examples, any other technique for collecting media impression data may be used. For example, server logs may be used to log media impressions in response to HTTP requests for media received from client devices. The impressions can be logged by the server in association with user/subscriber demographics based on user/device identifying information in the requests for media.

Examples disclosed herein identify the second frequency moment based on media impression data 132 generated by the monitoring entity 102. The media impression data 132 may include any of server logs, impressions, impression logs, device/user identifier(s), etc. As used herein, sketch data is an arrangement of data for use in massive data analyses. For example, operations and/or queries that are specified with respect to the explicit and/or very large subsets, can be processed instead in sketch space (e.g., quickly (but approximately) from the much smaller sketches representing the actual data). This enables processing each observed item of data (e.g., each logged media impression and/or audience member) quickly in order to create a summary of the current state of the actual data. In some examples, the sketch data corresponds to a vector of values generated by processing data entries in the database through one or more hash functions. More particularly, in some examples, the PII associated with particular audience members is used as inputs for the hash function(s) to generate outputs corresponding to the values of the vector for the sketch data. In examples disclosed herein, such inputs obtained from the PII are referred to herein as audience member identifiers. For example, audience member identifiers may be any identifier suitable for identifying a device and/or a user of the device (e.g., device/user identifier). Examples of audience member identifiers (e.g., device/user identifiers) may include a username, a full name, street address, a residence city and/or state, telephone numbers, email addresses, ages, dates of birth, social security numbers, demographic information, bank accounts, lists of purchased items, store visits, traffic patterns and/or any other personal information provided by subscribers in exchange for services from a monitoring entity. Inasmuch as hashing functions cannot be reversed, the PII data for the particular audience members is kept private, thereby preserving the anonymity of the underlying raw data represented by the sketch data.

The example audience metrics analyzer 124 is configured to, responsive to the monitoring entity 102 determining the media impression data 132, identify the second frequency moment of the stored media impression data 132. The second frequency moment of the media impression data 132 stored in the audience metrics database 120 provides insight regarding the repeat rate of certain elements in the audience metrics database 120. Such a second frequency moment can be used to estimate query times of the media impression data stored in the audience metrics database 120. For example, the second frequency moment provides insight as to the access costs (e.g., time, processing power, resource usage, etc.) of certain sets of data in the audience metrics database 120. Further in such an example, the audience metrics analyzer 124 may be used by the monitoring entity 102 in response to a query request of data within the audience metrics database 120. For example, one may submit a request to the monitoring entity 102 to identify the quantity in which a specific element, or set of elements, occurs within the audience metrics database 120. In applications in which there are millions of entries, such a query request may require significate time, processing power, energy costs, etc. Accordingly, the monitoring entity 102 can efficiently estimate the second frequency moment using the audience metrics analyzer 124 to better estimate the time, processing power, energy cost, etc., associated with the query request. With this, the monitoring entity 102 can more efficiently allocate resources prior, during, and in future scheduling to ensure the query request can be fulfilled. Example operation of the audience metrics analyzer 124 is described below.

Figure 2:
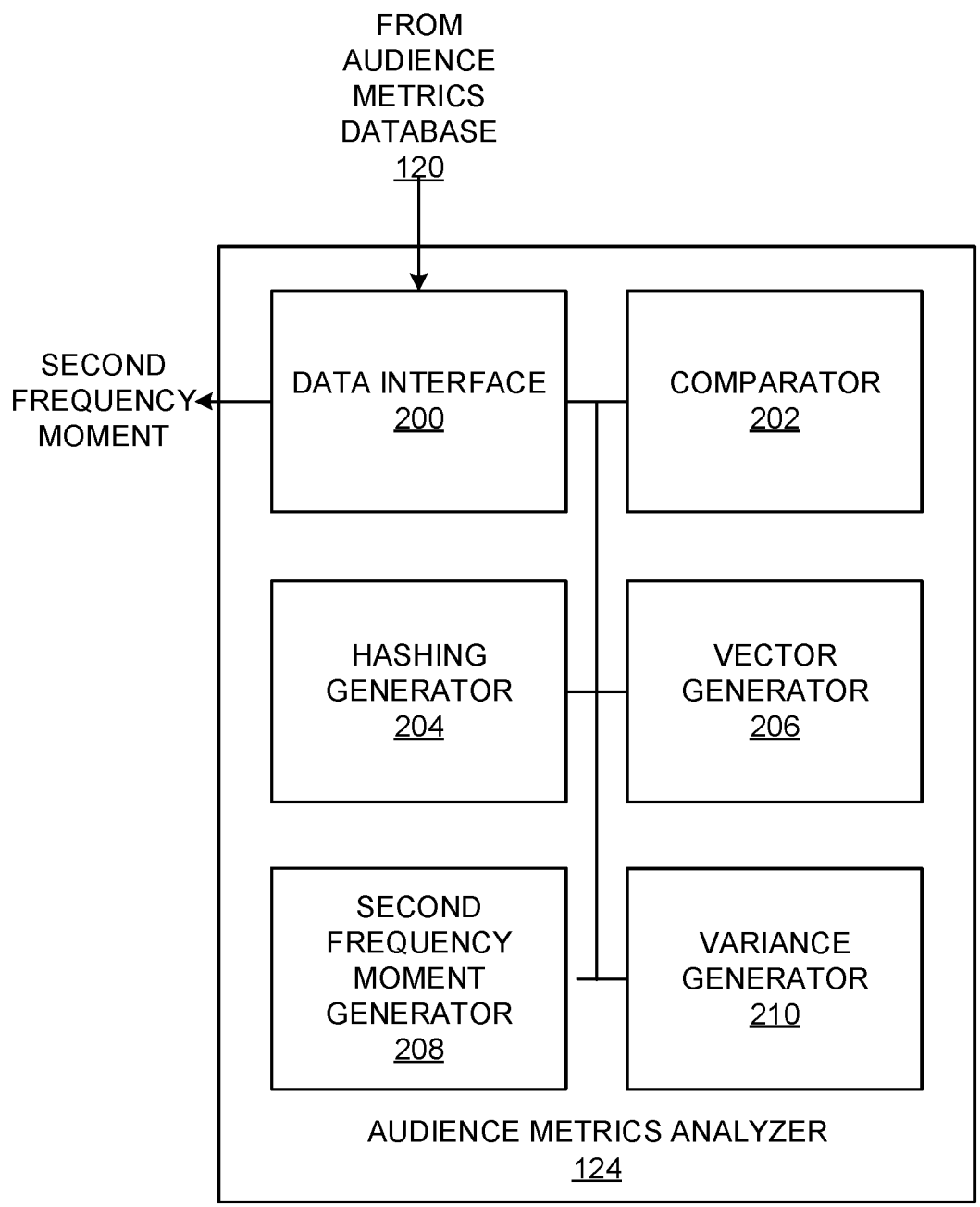
FIG. 2 is an example block diagram of the audience metrics analyzer of FIG. 1.

FIG. 2 is an example block diagram of the audience metrics analyzer 124 of FIG. 1. In FIG. 2, the audience metrics analyzer 124 includes an example data interface 200, an example comparator 202, an example hashing generator 204, an example vector generator 206, an example second frequency moment generator 208, and an example variance generator 210.

In FIG. 2, the example data interface 200 is configured to obtain the media impression data 132 stored in the audience metrics database 120 of FIG. 1. For example, the data interface 200 may process a query request by identifying and obtaining the media impression data 132 currently stored in the audience metrics database 120. In other examples, the data interface 200 may routinely (e.g., every hour, once a day, once a month, etc.), obtain the media impression data 132 stored in the audience metrics database 120. In such examples, the audience metrics analyzer 124 can estimate (e.g., determine) the second frequency moment associated with the data stored in the audience metrics database 120.

In some examples disclosed herein, prior to obtaining the media impression data 132, the example data interface 200 determines whether a query request is obtained. For example, the data interface 200 determines whether a user (e.g., a user of any of the client devices 108 intends to perform a query of the media impression data 132, whether the monitoring entity 102 intends to perform a query of the media impression data 132 (FIG. 1), etc.) has transmitted a query request. In the event the data interface 200 determines a query request is not obtained, the data interface 200 waits. In other examples disclosed herein, data interface 200 may initiate the generation of the second frequency moment in response to a threshold period of time regardless of a query request.

The example data interface 200 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In examples disclosed herein, the data interface 200 may be referred to as example means for input processing.

In the example illustrated in FIG. 2, the comparator 202 determines whether a precision threshold (e.g., $T_k$) associated with the determination of the second frequency moment has been determined. For example, the comparator 202 may obtain or have access to a previous precision threshold. In this manner, the comparator 202 identifies a length of the vector based on the precision threshold. For example, if the precision threshold is determined to be high with respect to the number of total elements in the audience metrics database 122 (e.g., a precision threshold of 50, 2,000, 10,000, etc.), the comparator 202 may indicate a high k value (e.g., 50, 2,000, 10,000, etc.) to the hashing generator 204.

In addition, the comparator 202 determines whether the query (e.g., the query request obtained by the data interface 200) can be completed based on the query processing constraints (e.g., an amount of computing resources and/or memory resources available). Example query processing constraints include time-based constraints and processing resource constraints. Example time-based constraints are scheduling constraints (e.g., conflicting high memory-utilization tasks, etc.). Example processing resource constraints are available memory utilization, available processing resources, etc. For example, in response to the query request, the comparator 320 utilizes the second frequency moment later generated by the second frequency moment generator 208 to determine aspects of the media impression data 132 corresponding to the repeat rate, occurrence, etc. In this manner, the comparator 202 can determine whether, based on the second frequency moment, enough processing resources are available to execute the query request. In the event the comparator 202 determines the query request cannot be completed, the comparator 202 schedules the query for a further date and time when the query request can be completed. For example, to execute a query request, the comparator 202 may determine that 5 gigabytes of RAM are needed in order to fulfil the query request. In this example, the comparator 202 determines whether 5 gigabytes of RAM are available and, thus, whether the query request can be completed. In other examples disclosed herein, the comparator 202 may determine whether enough processing cores are available, whether the processor is over-utilized (e.g., 70% of processing resources are allocated to a different task), etc.

While the comparator 202 is described as determining whether the query can be completed based on an amount of computing resources and/or memory resources available, the comparator 202 may compare any other suitable metric in determining whether the query can be completed. For example, the comparator 202 may estimate that the query will take four (4) minutes to complete. In such an example, the comparator 202 may determine whether there are future scheduled processing tasks that may cause over-utilization of the processing resources in the audience metrics analyzer 124 during execution of the query request. The example comparator 202 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In examples disclosed herein, the comparator 202 may be referred to as example means for managing.

In the example illustrated in FIG. 2, the hashing generator 204 is configured to input each element obtained by the data interface 200 through a hashing function. In examples disclosed herein, the hashing generator 204 identifies a precision threshold from the comparator 202 and, thus, implements the hashing function based on the precision threshold. In this manner, the output from the hashing generator 204 is a bit-value representation of the input data. Such a bit-value representation of the input data is transmitted to the vector generator 206. In examples disclosed herein, the comparator 202 identified whether there is/are additional data to be input to the hashing generator 204. The example hashing generator 204 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In examples disclosed herein, the hashing generator 204 may be referred to as example means for generating.

The example vector generator 206 is configured to obtain the bit-value representation of the data in the audience metrics database 120 from the hashing generator 204. In this manner, the vector generator 206 increments the kth position in the vector based on the output from the hashing generator 204. The example vector generator 206 iterates through each element until all elements have been input through the hashing generator 204. In result, the vector generator 206 populates and, thus, generates an example vector of counts. In examples disclosed herein, the vector of counts is a single vector of length k (e.g., determined based on the desired precision threshold), in which an element in the kth position is incremented based on the output from the hashing generator 204. The example vector generator 206 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In examples disclosed herein, the vector generator 206 may be referred to as example means for vector generating.

In the example illustrated in FIG. 2, the second frequency moment generator 208 is configured to generate a mean-centered vector based on the vector of counts generated by the vector generator 206. For example, the second frequency moment generator 208 may identify the mean of the elements in the vector of counts. In this manner, the second frequency moment generator 208 determines the mean-centered vector by subtracting the mean from each element in the vector of counts. The resulting vector, the mean-centered vector of counts, is then used by the second frequency moment generator 208 to estimate (e.g., determine) the second frequency moment. The example second frequency moment generator 208 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In examples disclosed herein, the second frequency moment generator 208 may be referred to as example means for identifying.

When determining the second frequency moment, the second frequency moment generator 208 determines a sum of all elements, individually squared, within the mean-centered vector of counts. Additionally, the second frequency moment generator 208 determines a ratio of the number of bins, k, divided with the number of bins, k, minus one (1). An example equation illustrative of instructions to be executed by the second frequency moment generator 208 to estimate (e.g., determine) the second frequency moment of the data in the audience metrics database 122 is show below, in y78.

$$\widehat{F_2} = \frac{k}{k-1} \sum_{j=1}^{k} x_j^2 \qquad \text{Equation 3}$$

In Equation 3, the variable $F_2$ corresponds to the second frequency moment, the variable k corresponds to the number of bins determined based on the desired precision threshold, the variable x corresponds to the mean-centered vector of counts (e.g., the mean-centered vector of counts generated by the second frequency moment generator 208), the variable j is an iterative variable corresponding to a position in the mean-centered vector of counts, x.

In the example illustrated in FIG. 2, the variance generator 210 is configured to verify whether to determine the variance of the second frequency moment, $F_2$, determined by the second frequency moment generator 208. In some examples, the variance generator 210 may verify to identify the variance of the second frequency moment, $F_2$, in the event a user instruction indicating to identify the variance is received, in the event the audience metrics analyzer 124 determines to identify the accuracy of the second frequency moment, $F_2$, determined by the second frequency moment generator 208, etc. In the event the variance generator 210 verifies to determine the variance of the second frequency moment, $F_2$, the variance generator 210 determines the variance of the second frequency moment. In operation, the variance generator 210 determines a ratio of (1) the second frequency moment, $F_2$, squared, times two, and (2) the number of bins, k, minus 1. An example equation illustrative of instructions to be executed by the variance generator 210 to determine the variance of the second frequency moment of the data in the audience metrics database 122 is shown below, in Equation 4.

$$\widehat{Var(F_2)} = \frac{2\widehat{F_2^2}}{k-1} \qquad \text{Equation 4}$$

In Equation 4, the variable $Var(F_2)$ corresponds to the variance of the second frequency moment and the variable k corresponds to the number of bins determined based on the desired precision threshold.

In addition, Equation 5 below shows that the estimate of $F_2$ is an unbiased estimate. As such, the variance decreases as the length of the vector (e.g., k) increases. Having an unbiased estimator (e.g., as shown in Equation 5 below) is useful to substantially reduce or eliminate bias in estimates generated using examples disclosed herein.

$$E(\widehat{F_2}) = F_2 \qquad \text{Equation 5}$$

The example variance generator 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc. In examples disclosed herein, the variance generator 210 may be referred to as example means for variance processing.

While an example manner of implementing the audience metrics analyzer 124 of FIG. 1 is illustrated in FIG. 2, one or more of the elements, processes and/or devices illustrated in FIG. 2 may be combined, divided, re-arranged, omitted, eliminated and/or implemented in any other way. Further, the example data interface 200, the example comparator 202, the example hashing generator 204, the example vector generator 206, the example second frequency moment generator 208, the example variance generator 210, and/or, more generally, the example audience metrics analyzer 124 of FIG. 1 may be implemented by hardware, software, firmware and/or any combination of hardware, software and/or firmware. Thus, for example, any of the example data interface 200, the example comparator 202, the example hashing generator 204, the example vector generator 206, the example second frequency moment generator 208, the example variance generator 210, and/or, more generally, the example audience metrics analyzer 124 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data interface 200, the example comparator 202, the example hashing generator 204, the example vector generator 206, the example second frequency moment generator 208, and/or the example variance generator 210 is/are hereby expressly defined to include a non-transitory computer readable storage device or storage disk such as a memory, a digital versatile disk (DVD), a compact disk (CD), a Blu-ray disk, etc. including the software and/or firmware. Further still, the example audience metrics analyzer 124 of FIG. 1 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
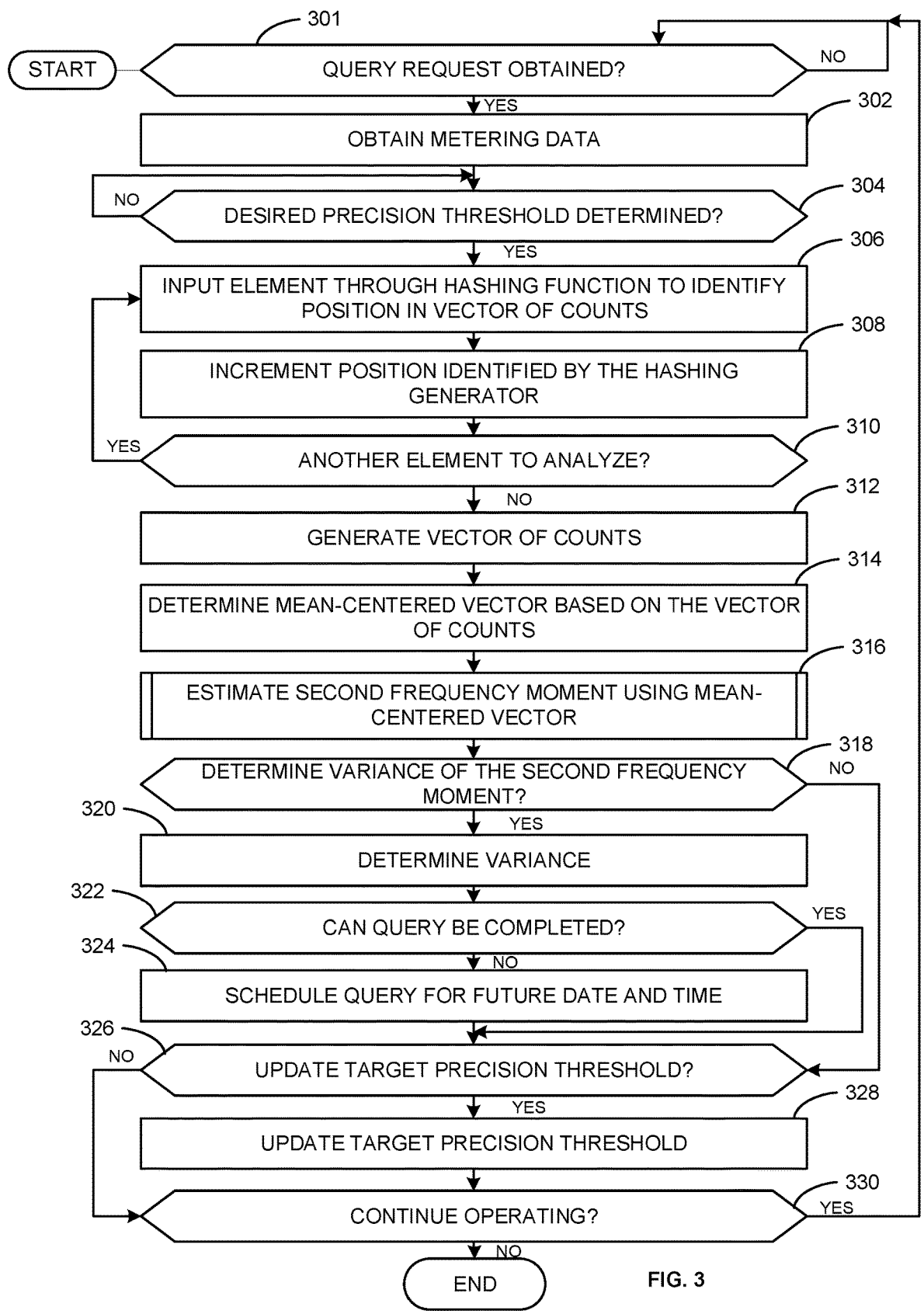
FIG. 3 is a flowchart representative of example machine-readable instructions which may be executed to implement the example audience metrics analyzer of FIGS. 1 and/or 2.

Flowcharts representative of example hardware logic, machine readable instructions, hardware implemented state machines, and/or any combination thereof for implementing the audience metrics analyzer 124 of FIG. 1 are shown in FIGS. 3 and/or 4. The machine readable instructions may be one or more executable programs or portion(s) of an executable program for execution by a computer processor such as the processor 512 shown in the example processor platform 500 discussed below in connection with FIG. 5. The program may be embodied in software stored on a non-transitory computer readable storage medium such as a CD-ROM, a floppy disk, a hard drive, a DVD, a Blu-ray disk, or a memory associated with the processor 512, but the entire program and/or parts thereof could alternatively be executed by a device other than the processor 512 and/or embodied in firmware or dedicated hardware. Further, although the example program is described with reference to the flowcharts illustrated in FIGS. 3 and/or 4, many other methods of implementing the example audience metrics analyzer 124 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 3 and/or 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of example machine-readable instructions 300 which may be executed to implement the example audience metrics analyzer 124 of FIGS. 1 and/or 2 to estimate the second frequency moment. In FIG. 3, the example data interface 200 (FIG. 2) determines whether a query request is obtained. (Block 301). For example, the data interface 200 determines whether a query has been received (e.g., from the monitoring entity 102) to perform a query of the media impression data 132 (FIG. 1). In the event the data interface 200 determines a query request is not obtained (e.g., the control of block 301 returns a result of NO), the instructions wait. Alternatively, in the event the data interface 200 determines a query request is available (e.g., the control of block 301 returns a result of YES), the instructions proceed to block 302. In other examples disclosed herein, the instructions may proceed to block 302 in response to a threshold period of time indicating to execute the instructions 300 regardless of a query request. For example, the data interface 200 may execute the instructions illustrated in block 302 every week, every hour, after a threshold period of attempts to identify a query request, etc.

In FIG. 3, the example data interface 200 of FIG. 2 obtains the media impression data 132. (Block 302). For example, the data interface 200 obtains media impression data 132 stored in the audience metrics database 120 of FIG. 1.

The example comparator 202 (FIG. 2) determines whether a target precision threshold (e.g., $T_k$) associated with the determination of the second frequency moment has been determined. (Block 304). For example, the comparator 202 may perform an initial check to determine whether the generation of a precision threshold (e.g., $T_k$) is needed. As an example, in the event a database includes one million rows, depending on the amount of duplication, there can be two extremes (e.g., all rows are distinct and unique, or there exists one million copies of the same item). Because the variance includes (k−1) in the denominator, larger k values result in lower variances. However, in examples disclosed herein, the value of k should not be set too small (e.g., if k=1 the variance is undefined, and every item gets assigned to the same singular position). In addition, the value of k should not be set too large (e.g., k=1,000,000) because it would be the same as actually keeping track of every item in memory and how many times they appear. In that case, no estimation is needed as it is an exact answer just by counting the frequencies. Thus, the selection of k becomes an analysis in tradeoffs between higher k values for lower variance, and lower k values (compared to the size of the database) for improved use of computer memory and improved computer processing speed. For example, if there are $10^{10}$ entries in a database, and all cannot be loaded into memory, the entries have to be streamed, looking at one item at a time. In such instances, examples disclosed herein estimate the second frequency moment also by streaming as each item is allocated to one of k bins independent of when it may be in the actual database. Accordingly, the comparator 202 may determine a k value so that it is not too large (e.g., a k value equal to 1,000,000 results in inefficiencies in analyzing the bins) and not too small (e.g., a k value equal to 1 results in the same bin assigned to each input). In this manner, the value of k may be determined by the comparator 202 in response to analyzing the trade-offs for either a higher k and lower variance, or a lower k and better computer memory utilization and computer processing speed. In the event the example comparator 202 determines a target precision threshold (e.g., $T_k$) has not been determined (e.g., the control of block 304 returns a result of NO), the instructions wait. In some examples disclosed herein, there may be a threshold period of time after which the comparator 202 assigns an arbitrary number of bins (e.g., a number of bins equal to one tenth of the total elements in the input data, etc). In other examples disclosed herein, there may be a threshold number of attempts after which the comparator 202 assigns an arbitrary desired precision threshold (e.g., one tenth of the total elements in the input data, etc).

In the event the example comparator 202 determines a target precision threshold has been determined (e.g., the control of block 304 returns a result of YES), the hashing generator 204 (FIG. 2) inputs an element obtained by the data interface 200 through a hashing function to identify the kth position in the vector of counts. (Block 306). For example, the element is obtained from the audience metrics database 120 and represents a portion of the media impression data 132 stored in the audience metrics database 120. The element may be information from a logged impression record, a portion of a server log, etc. As discussed above, an example hashing function is used by the hashing generator 204 to generate a bit-value representation of the element(s) and/or otherwise portion(s) of the media impression data 132 stored in the audience metrics database 120.

In response, the example vector generator 206 (FIG. 2) increments the element in the kth position identified by the hashing generator 204. (Block 308). For example, the hashing generator 204 may output a hash value of 0.29 which represents the k=3 position (e.g., bin number 3 in the vector). For example, based on the bit-value representation of the element in the media impression data 132 obtained from the hashing generator 204, the vector generator 206 increments the corresponding kth position of the vector of counts. In examples disclosed herein, the comparator 202 determines whether there are additional elements to analyze. (Block 310). For example, the comparator 202 may determine whether there are additional portion(s) of the media impression data 132 (e.g., additional logged impressions, additional server logs, etc.) to be processed by the hashing generator 204. In the event the comparator 202 determines there are additional elements to analyze (e.g., the control of block 310 returns a result of YES), the instructions return to block 306.

Alternatively, in the event the comparator 202 determines there are no additional elements to analyze (e.g., the control of block 310 returns a result of NO), the vector generator 206 generates the vector of counts. (Block 312). For example, the vector generator 206 may accumulate all elements previously generated into a singular matrix of length k (e.g., the number of bins determined based on the desired precision threshold). In response to the execution of the instructions illustrated in block 312, the second frequency moment generator 208 determines (e.g., generates) a mean-centered vector based on the vector of counts generated by the vector generator 206. (Block 314). For example, the second frequency moment generator 208 may identify the mean of the elements in the vector of counts. In this manner, the second frequency moment generator 208 determines the mean-centered vector by subtracting the mean from each element in the vector of counts.

The resulting vector, the mean-centered vector of counts, is used by the second frequency moment generator 208 to estimate (e.g., determine) the second frequency moment. (Block 316). For example, the second frequency moment generator 208 can estimate the second frequency moment using the mean-centered vector. Additional description of the instructions represented by block 316 is described below, in connection with FIG. 4.

In the example illustrated in FIG. 3, the variance generator 210 verifies whether to determine the variance of the second frequency moment, $F_2$, determined by the second frequency moment generator 208. (Block 318). In the event the example variance generator 210 verifies to determine the variance of the second frequency moment (e.g., the control of block 318 returns a result of YES), the variance generator 210 determines the variance of the second frequency moment. (Block 320). For example, the variance generator 210 may execute instructions representing Equation 4 to determine the variance of the second frequency moment.

At block 322, the example comparator 202 determines whether the query can be completed based on query processing constraints of the audience metrics analyzer 124. (Block 322). For example, in response to the query request, the comparator 320 utilizes the second frequency moment to determine aspects of the media impression data 132 corresponding to the repeat rate, occurrence, etc. In this manner, the example comparator 202 can determine whether, based on the second frequency moment, enough processing resources are available to execute the query request. In the event the example comparator 202 determines the query request cannot be completed (e.g., the control of block 322 returns a result of NO), the comparator 202 schedules the query for a further date and time when the query request can be completed. (Block 324). For example, the comparator 202 may determine that the query request will take four minutes to complete. In the event tasks that require significant processing resources (e.g., migrating a memory that, when executed, may utilize 95% of the CPU's processing resources) are scheduled during the next four minutes, the comparator 202 may determine to either delay the query for a future date and time, or delay the tasks that require significant processing resources. Alternatively, in the event the comparator 202 determines that the query request can be completed (e.g., the control of block 322 returns a result of YES), the control proceeds to block 326.

In response to execution of instructions represented by block 324, or in response to the comparator 202 determining the query can be completed within the query processing constraint(s) (e.g., the control of block 322 returns a result of YES), the comparator 202 determines whether to update the desired precision threshold. (Block 326). For example, the comparator 202 may determine not to update the desired precision threshold in the event a more accurate second frequency moment is requested, etc. In the event the example comparator 202 determines to update the desired precision threshold (e.g., the control of block 326 returns a result of YES), the comparator 202 updates the target precision threshold. (Block 328). In such an event, the example comparator 202 communicates the updated target precision threshold to the hashing generator 204.

Alternatively, in the event the example comparator 202 determines not to update the target precision threshold (e.g., the control of block 322 returns a result of NO), or in response to the execution of the instructions represented by block 328, the audience metrics analyzer 124 determines whether to continue operating. (Block 330). In examples disclosed herein, the audience metrics analyzer 124 may determine to continue operating in response to an additional request to determine the second frequency moment, in response to additional data stored in the audience metrics database 122, etc. Alternatively, in examples disclosed herein, the audience metrics analyzer 124 may determine not to continue operating in response to a loss of power, etc.

In the event the example audience metrics analyzer 124 determines to continue operating (e.g., the control of block 330 returns a result of YES), the control returns to block 301. Alternatively, in the event the example audience metrics analyzer 124 determines not to continue operating (e.g., the control of block 330 returns a result of NO), the instructions stop.

Figure 4:
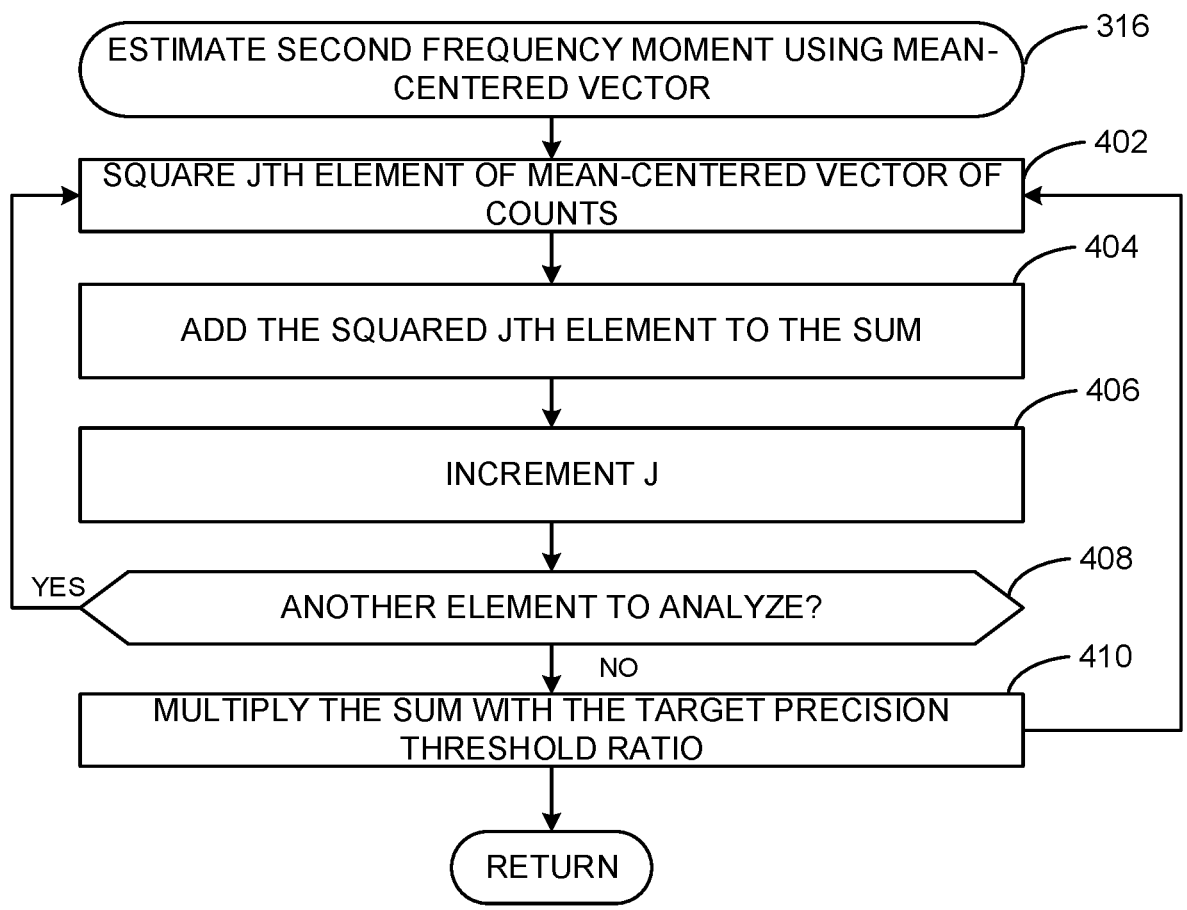
FIG. 4 is a flowchart representative of example machine-readable instructions which may be executed to implement the example audience metrics analyzer of FIGS. 1 and/or 2 to estimate the second frequency moment.

FIG. 4 is a flowchart representative of example machine-readable instructions 400 which may be executed to implement the example audience metrics analyzer 124 of FIGS. 1 and/or 2 to estimate the second frequency moment. At block 402, the example second frequency moment generator 208 squares the element in the jth position of the mean-centered vector of counts. (Block 402). In response, the example second frequency moment generator 208 adds the recently squared element in the jth position to the sum. (Block 404). For example, the initial sum may be zero (0), and, thus, the second frequency moment generator 208 indicates the squared element in the jth position as the sum. Accordingly, in subsequent iterations, the newly squared elements in the jth positions are added to the sum by the second frequency moment generator 208.

Thus, in response to the execution of the instructions represented by block 404, the example second frequency moment generator 208 increments the variable j. (Block 406). Additionally, the second frequency moment generator 208 determines whether there is another element to analyze. (Block 408). In the event the example second frequency moment generator 208 determines there is another element to analyze (e.g., the control of block 408 returns a result of YES), the instructions return to block 402.

Alternatively, in the event the example second frequency moment generator 208 determines there is not an additional element to analyze (e.g., the control of block 408 returns a result of NO), the second frequency moment generator 208 multiplies the sum with the number of bins determined based on the target precision threshold ratio. (Block 410). For example, the target precision threshold ratio is a ratio of the number of bins determined based on the target precision threshold, k, divided with the number of bins determined based on the target precision threshold, k, minus one (1). For example, the target precision threshold ratio may be determined by the second frequency moment generator 208 by executing instructions representing Equation 6, below.

$$\text{Target Precision Threshold Ratio} = \frac{k}{k-1} \quad \text{Equation 6}$$

An example equation illustrative of instructions to be executed by the second frequency moment generator 208 to determine the second frequency moment of the data in the audience metrics database 122 is shown above, in Equation 3.

In response to the execution of the instructions represented by block 410, control returns to block 318 of FIG. 3.

Figure 5:
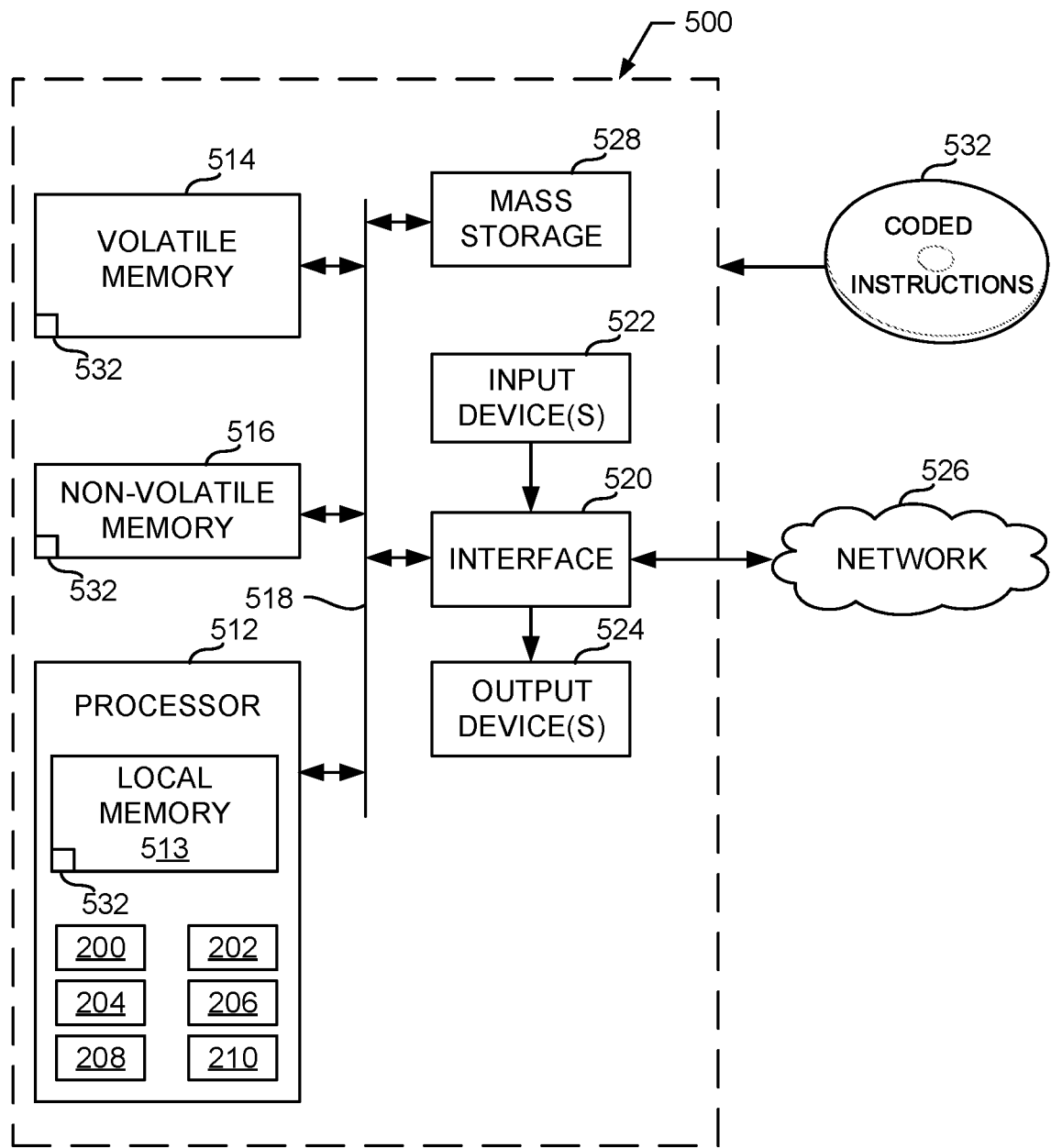
FIG. 5 is a block diagram of an example processor platform structured to execute the instructions of FIGS. 3 and/or 4 to implement the audience metrics analyzer of FIGS. 1 and/or 2.

FIG. 5 is a block diagram of an example processor platform 500 structured to execute the instructions of FIGS. 3 and/or 4 to implement the audience metrics analyzer 124 of FIGS. 1 and/or 2. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 500 of the illustrated example includes a processor 512. The processor 512 of the illustrated example is hardware. For example, the processor 512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data interface 200, the example comparator 202, the example hashing generator 204, the example vector generator 206, the example second frequency moment generator 208, and/or the example variance generator 210.

The processor 512 of the illustrated example includes a local memory 513 (e.g., a cache). The processor 512 of the illustrated example is in communication with a main memory including a volatile memory 514 and a non-volatile memory 516 via a bus 518. The volatile memory 514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 516 may be implemented by flash memory and/or any other desired type of memory device. Access to the main memory 514, 516 is controlled by a memory controller.

The processor platform 500 of the illustrated example also includes an interface circuit 520. The interface circuit 520 may be implemented by any type of interface standard, such as an Ethernet interface, a universal serial bus (USB), a Bluetooth® interface, a near field communication (NFC) interface, and/or a PCI express interface.

In the illustrated example, one or more input devices 522 are connected to the interface circuit 520. The input device(s) 522 permit(s) a user to enter data and/or commands into the processor 512. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 524 are also connected to the interface circuit 520 of the illustrated example. The output devices 524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 520 of the illustrated example, thus, typically includes a graphics driver card, a graphics driver chip and/or a graphics driver processor.

The interface circuit 520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 500 of the illustrated example also includes one or more mass storage devices 528 for storing software and/or data. Examples of such mass storage devices 528 include floppy disk drives, hard drive disks, compact disk drives, Blu-ray disk drives, redundant array of independent disks (RAID) systems, and digital versatile disk (DVD) drives.

Machine executable instructions 532 represented in FIGS. 3 and/or 4 may be stored in the mass storage device 528, in the volatile memory 514, in the non-volatile memory 516, and/or on a removable non-transitory computer readable storage medium such as a CD or DVD.

From the foregoing, it will be appreciated that example methods, apparatus and articles of manufacture have been disclosed that estimate the second frequency moment of data. Examples disclosed herein employ methods and apparatus to estimate the second frequency moment of data from a non-deduplicated databased associated with a single media provider. Examples disclosed herein employ a vector of counts methodology to estimate the second frequency moment. Disclosed methods, apparatus and articles of manufacture improve the efficiency of using a computing device by estimating the second frequency moment to determine query times and costs associated with a set of data. In applications in which there are millions of entries, such a query request may require significate computer processing time, computer processing power, computer energy costs, etc. Accordingly, examples disclosed herein can efficiently estimate the second frequency moment to better estimate the computer processing time, computer processing power, computer energy cost, etc., associated with servicing the query request. Examples disclosed herein can more efficiently allocate resources prior, during, and in future scheduling to service the query request. For example, examples disclosed herein can determine whether a query can be serviced within query processing constraints that may be selected to improve the operation of a computer by not consuming so many computing resources that other processes on the same computer would exhibit poor performance or be unable to function. Examples disclosed herein may also be used to improve operation of a computer by deferring servicing of queries to a later time when a query cannot be immediately serviced due to query processing constraints not being satisfied by immediately available computing resources and/or computer processing time. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to estimate the second frequency moment for computer-monitored media accesses are disclosed herein. Further examples and combinations thereof include the following:

Example 1 includes an apparatus to determine whether a computer can complete a query request associated with media impression data based on a second frequency moment of the media impression data, the apparatus comprising a hashing generator to, in response to a query request, input a first audience member identifier and a second audience member identifier of the media impression data through a hashing function, an output of the hashing generator being a first bit-value representation of the first audience member identifier and a second bit-value representation of the second audience member identifier, a vector generator to, responsive to obtaining the output of the hashing generator, increment first and second values of corresponding first and second positions in a vector based on the first and second bit-value representations, respectively, a second frequency moment generator to estimate the second frequency moment of the media impression data using the vector, and a comparator to, using the second frequency moment, determine whether the computer can complete the query request of the media impression data based on query processing constraints.

Example 2 includes the apparatus of example 1, wherein the comparator is to determine a precision threshold, the precision threshold to be transmitted to the hashing generator for use in determining a number of positions of the vector.

Example 3 includes the apparatus of example 1, wherein the second frequency moment generator is to estimate the second frequency moment by squaring the first value stored in the first position, squaring the second value stored in the second position, summing the first and second values, and multiplying the sum of the first and second values by a precision threshold ratio.

Example 4 includes the apparatus of example 3, wherein the first and second values correspond to the first and second positions, respectively, in a mean-centered vector, the mean-centered vector being generated based on the vector.

Example 5 includes the apparatus of example 1, wherein the second frequency moment generator is to determine a mean-centered vector based on the vector, the second frequency moment generator to use the mean-centered vector to estimate the second frequency moment.

Example 6 includes the apparatus of example 1, further including a data interface to obtain the media impression data from an audience metrics database, the media impression data corresponding to audience member totals for media.

Example 7 includes the apparatus of example 6, wherein the media impression data includes a plurality of audience member identifiers, the first audience member identifier of the plurality of audience member identifiers being a duplicate of the second audience member identifier of the plurality of audience member identifiers.

Example 8 includes the apparatus of example 1, wherein the query processing constraints include at least one of a scheduling constraint, available memory utilization, or available processing resources.

Example 9 includes a non-transitory computer readable medium comprising computer readable instructions which, when executed, cause a processor to at least in response to a query request, input a first audience member identifier and a second audience member identifier of media impression data through a hashing function, an output being a first bit-value representation of the first audience member identifier and a second bit-value representation of the second audience member identifier, increment first and second values of corresponding first and second positions in a vector based on the first and second bit-value representations, respectively, estimate the second frequency moment of the media impression data using the vector, and using the second frequency moment, determine whether the processor can complete the query request of the media impression data based on query processing constraints.

Example 10 includes the computer readable medium of example 9, wherein the instructions, when executed, cause the processor to determine a precision threshold, the precision threshold to be used in determining a number of positions of the vector.

Example 11 includes the computer readable medium of example 9, wherein the instructions, when executed, cause the processor to estimate the second frequency moment by squaring the first value stored in the first position, squaring the second value stored in the second position, summing the first and second values, and multiplying the sum of the first and second values by a precision threshold ratio.

Example 12 includes the computer readable medium of example 11, wherein the first and second values correspond to the first and second positions, respectively, in a mean-centered vector, the mean-centered vector being generated based on the vector.

Example 13 includes the computer readable medium of example 9, wherein the instructions, when executed, cause the processor to determine a mean-centered vector based on the vector, and estimate the second frequency moment using the mean-centered vector.

Example 14 includes the computer readable medium of example 9, wherein the instructions, when executed, cause the processor to obtain the media impression data from an audience metrics database, the media impression data corresponding to audience member totals for media.

Example 15 includes the computer readable medium of example 14, wherein the media impression data includes a plurality of audience member identifiers, the first audience member identifier of the plurality of audience member identifiers being a duplicate of the second audience member identifier of the plurality of audience member identifiers.

Example 16 includes the computer readable medium of example 9, wherein the query processing constraints include at least one of a scheduling constraint, available memory utilization, or available processing resources.

Example 17 includes a method to determine whether a computer can complete query request associated with media impression data based on a second frequency moment of the media impression data, the method comprising in response to a query request, inputting a first audience member identifier and a second audience member identifier of media impression data through a hashing function, an output being a first bit-value representation of the first audience member identifier and a second bit-value representation of the second audience member identifier, incrementing first and second values of corresponding first and second positions in a vector based on the first and second bit-value representations, respectively, estimating the second frequency moment of the media impression data using the vector, and using the second frequency moment, determining whether the computer can complete the query request of the media impression data based on query processing constraints.

Example 18 includes the method of example 17, further including determining a precision threshold, the precision threshold to be used in determining a number of positions of the vector.

Example 19 includes the method of example 17, further including estimating the second frequency moment by squaring the first value stored in the first position, squaring the second value stored in the second position, summing the first and second values, and multiplying the sum of the first and second values by a precision threshold ratio.

Example 20 includes the method of example 19, wherein the first and second values correspond to the first and second positions, respectively, in a mean-centered vector, the mean-centered vector being generated based on the vector.

The following claims are hereby incorporated into this Detailed Description by this reference, with each claim standing on its own as a separate embodiment of the present disclosure.

The invention claimed is:

1. A system to determine a variance of a second frequency moment of media impression data, the system comprising:
at least one memory;
programmable circuitry; and
instructions to cause the programmable circuitry to:
increment a first value corresponding to a first position in a vector based on a first bit value representation, the first bit value representation corresponding to a first audience member identifier;
increment a second value corresponding to a second position in the vector based on a second bit value representation, the second bit value representation corresponding to a second audience member identifier;
estimate the second frequency moment of the media impression data using the vector;
determine the variance of the second frequency moment; and
based on the second frequency moment, schedule a query of the media impression data to be processed by a computer at a future time.

2. The system of claim 1, wherein the programmable circuitry is to determine the variance of the second frequency moment by:
determining a first result by squaring the second frequency moment;
doubling the first result;
determining a second result by subtracting one from a number of positions in the vector; and
determining a ratio of the first result and the second result.

3. The system of claim 2, wherein the number of positions in the vector is based on a target precision threshold.

4. The system of claim 3, wherein the programmable circuitry is to determine whether to update the target precision threshold after determining whether the computer can complete the query of the media impression data based on a processing constraint.

5. The system of claim 4, wherein, based on a request for a more accurate second frequency moment, the programmable circuitry is to determine not to update the target precision threshold.

6. The system of claim 4, wherein the processing constraint includes at least one of a scheduling constraint, available memory utilization, or an available processing resource.

7. The system of claim 1, wherein the programmable circuitry is to obtain the media impression data from an audience metrics database, the media impression data corresponding to an audience member total for a media item.

8. A non-transitory computer readable medium comprising computer readable instructions which, when executed, cause processor circuitry to at least:
increment, based on a first bit value representation, a first value corresponding to a first position in a vector, the first bit value representation corresponding to a first audience member;
increment, based on a second bit value representation, a second value corresponding to a second position in the vector, the second bit value representation corresponding to a second audience member;
estimate a second frequency moment of media impression data using the vector;
determine a variance of the second frequency moment; and
based on the second frequency moment, schedule a date and time for a computer to complete a query request of the media impression data.

9. The non-transitory computer readable medium of claim 8, wherein the instructions are to cause the processor circuitry to determine the variance of the second frequency moment by:
determining a first result by squaring the second frequency moment;
doubling the first result;
determining a second result by subtracting one from a number of positions in the vector; and
determining a ratio of the first result and the second result.

10. The non-transitory computer readable medium of claim 9, wherein the number of positions in the vector is based on a target precision threshold.

11. The non-transitory computer readable medium of claim 10, wherein the instructions are to cause the processor circuitry to determine whether to update the target precision threshold after determining whether the computer can complete the query request of the media impression data based on a processing constraint.

12. The non-transitory computer readable medium of claim 11, wherein, based on a request for a more accurate second frequency moment, the instructions are to cause the processor circuitry to determine not to update the target precision threshold.

13. The non-transitory computer readable medium of claim 11, wherein the processing constraint includes at least one of a scheduling constraint, available memory utilization, or an available processing resource.

14. The non-transitory computer readable medium of claim 8, wherein the instructions are to cause the processor circuitry to obtain the media impression data from an audience metrics database, the media impression data corresponding to an audience member total for a media item.

15. A method comprising:
incrementing, by executing an instruction with a processor, a first value corresponding to a first position in a vector, the incrementing of the first value based on a first bit value representation, the first bit value representation corresponding to a first audience member identifier;
incrementing, by executing an instruction with the processor, a second value corresponding to a second position in the vector, the incrementing of the second value based on a second bit value representation, the second bit value representation corresponding to a second audience member;
estimating, by executing an instruction with the processor, a second frequency moment of media impression data using the vector;
determining, by executing an instruction with the processor, a variance of the second frequency moment; and based on the second frequency moment, executing a query of the media impression data with the processor at a scheduled time.

16. The method of claim 15, further including:
determining a first result by squaring the second frequency moment;
doubling the first result;
determining a second result by subtracting one from a number of positions in the vector; and
determining a ratio of the first result and the second result.

17. The method of claim 16, wherein the number of positions in the vector is based on a target precision threshold.

18. The method of claim 17, further including determining whether to update the target precision threshold after determining whether the processor can complete the query of the media impression data based on a query processing constraint.

19. The method of claim 18, further including, based on a request for a more accurate second frequency moment, determining not to update the target precision threshold.

20. The method of claim 18, wherein the query processing constraint includes at least one of a scheduling constraint, available memory utilization, or an available processing resource.

21. The method of claim 15, further including obtaining the media impression data from an audience metrics database, the media impression data corresponding to an audience member total for a media item.

* * * * *